United States Patent
Ravishankar

(10) Patent No.: US 7,123,710 B2
(45) Date of Patent: *Oct. 17, 2006

(54) METHOD AND SYSTEMS FOR INTELLIGENT SIGNALING ROUTER-BASED SURVEILLANCE

(75) Inventor: Venkataramaiah Ravishankar, Apex, NC (US)

(73) Assignee: Tekelec, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/332,413

(22) Filed: Jan. 13, 2006

(65) Prior Publication Data

US 2006/0133595 A1    Jun. 22, 2006

Related U.S. Application Data

(63) Continuation of application No. 10/119,274, filed on Apr. 9, 2002, now Pat. No. 6,987,849.

(51) Int. Cl.
*H04M 7/00* (2006.01)

(52) U.S. Cl. .............................. 379/221.1; 379/32.05; 379/35; 379/126; 379/133; 379/112.01; 379/229

(58) Field of Classification Search ............. 379/32.05, 379/35, 126, 133, 112.01, 221.1, 229
See application file for complete search history.

(56) References Cited

U.S. PATENT DOCUMENTS

| | | | |
|---|---|---|---|
| 5,881,132 A | 3/1999 | O'Brien et al. | |
| 5,923,744 A | 7/1999 | Cheng | |
| 5,930,698 A | 7/1999 | Beracchi | |
| 5,937,056 A | 8/1999 | Coyne et al. | |
| 6,078,648 A | 6/2000 | Albers et al. | |
| 6,097,798 A | 8/2000 | Albers et al. | |
| 6,229,887 B1 | 5/2001 | Albers et al. | |
| 6,233,313 B1 | 5/2001 | Farris et al. | |
| 6,418,208 B1 | 7/2002 | Gundlach et al. | |
| 6,496,483 B1 | 12/2002 | Kung et al. | |
| 6,504,907 B1 * | 1/2003 | Farris et al. | ........ 379/35 |
| 6,549,613 B1 * | 4/2003 | Dikmen | ........ 379/70 |
| 6,553,025 B1 | 4/2003 | Kung et al. | |
| 6,650,633 B1 | 11/2003 | Albers et al. | |
| 6,765,931 B1 | 7/2004 | Rabenko et al. | |
| 2001/0052081 A1 | 12/2001 | McKibben et al. | |
| 2002/0009973 A1 | 1/2002 | Bondy et al. | |
| 2003/0188012 A1 | 10/2003 | Ford | |
| 2003/0219103 A1 | 11/2003 | Rao et al. | |
| 2004/0003097 A1 | 1/2004 | Willis et al. | |

* cited by examiner

*Primary Examiner*—Quynh H. Nguyen
(74) *Attorney, Agent, or Firm*—Jenkins, Wilson, Taylor & Hunt, P.A.

(57) ABSTRACT

Methods and systems for intelligent signaling-router-based surveillance are disclosed. A surveillance and signaling router receives call signaling messages, identifies call signaling messages associated with users under surveillance and determines a surveillance type for the call signaling messages. If the surveillance type is content-related, the surveillance and signaling router forwards the message to a call server. The call server replaces parameters in the message and in subsequent messages so that the call is transparently set up through a media proxy server. The media proxy server copies the media stream to a delivery function. If the surveillance type is non-content-related, the surveillance and signaling router sends a copy of the message or information extracted from the message to an external device.

40 Claims, 5 Drawing Sheets

METHOD AND SYSTEMS FOR INTELLIGENT SIGNALING ROUTER-BASED SURVEILLANCE

RELATED APPLICATIONS

This application is a continuation of U.S. patent application Ser. No. 10/119,274, filed Apr. 9, 2002 now U.S. Pat. No. 6,987,849, the disclosure of which is incorporated herein by reference in its entirety.

TECHNICAL FIELD

The present invention relates generally to methods and systems for surveillance or a user or user equipment in a communications network. More particularly, the present invention relates to methods and systems for intelligent surveillance using a signaling router in a communications network.

BACKGROUND ART

In October 1994, Congress took action to protect public safety and national security by enacting the Communications Assistance for Law Enforcement Act of 1994 (CALEA) Pub. L. No. 103–414,108 Stat. 4279. CALEA further defines the existing statutory obligation of telecommunications carriers to assist law enforcement in executing electronic surveillance pursuant to court order or other lawful authorization. In response to CALEA, the Telecommunications Industry Association produced a standard, referred to as J-STD-25 or J Standard to specify CALEA requirements for telecommunications service providers In response to CALEA and the J Standard, telecommunications service providers have developed systems that allow surveillance of users. However, one problem with such systems is that they are typically switch based, meaning that the systems are implemented at customer access points, such as end offices or mobile switching centers. One problem with providing surveillance capabilities at a customer access point is that such surveillance capabilities must be provided at every customer access point in a service provider's network in order to be effective. In addition, because access points or switches typically handle non-surveillance calls and surveillance calls, performing surveillance at these nodes can lead to processing bottlenecks and does not provide a scalable solution.

Moreover, some IP-based telephony protocols, such as the session initiation protocol (SIP), may not require an end office. In such protocols, calls may be routed through a softswitch or a feature server. Since softswitchs and feature servers typically handle non-surveillance as well as surveillance calls, like conventional switch-based solutions, performing surveillance at these nodes can lead to processing bottlenecks and does not provide a scalable solution.

Another problem associated with efficiently performing surveillance in today's communications networks is that many different protocols may be used. For example, a call that a government agency desires to monitor may be initiated from a SIP client to an H.323 client. The signaling messages used to set up the call may include both SIP and H.323 messages. Conventional surveillance techniques are typically directed to a single protocol and are incapable of monitoring messages in multiple protocols for a single call.

Yet another problem associated with conventional surveillance techniques is that there is no ability to identify and optimize the surveillance being performed based on the type of surveillance required by the law enforcement agency. For example, CALEA defines three types of surveillance. These types are pen register surveillance, trap and trace, and interception. Each of these types of surveillance requires different resources in order to be performed. However, conventional switch or call-server-based wire tapping techniques are incapable of automatically distinguishing between the type of surveillance required and optimizing the use of network nodes, such as call servers, based on the surveillance type.

Accordingly, there exists a need for improved methods and systems for intelligent surveillance or users or user equipment in a communications network.

DISCLOSURE OF THE INVENTION

The present invention includes methods and systems for intelligent signaling-router-based surveillance. Signaling routers, such as signal transfer points and SIP signaling routers, are typically located at centralized points in the network and route all call signaling messages within a network. Accordingly, locating surveillance functionality at a signaling router, rather than a customer access point, decreases the cost and time required to deploy such a system.

The surveillance methods and systems according to the present invention are capable of distinguishing between the type of surveillance required and taking appropriate action based on the determined surveillance type. For example, if the type of surveillance is interception, user data or content communications must be monitored. As a result, the surveillance methods and systems according to the present invention may notify a call server that content or user data surveillance is required. The call server may initiate a call between the end user or users under surveillance through a media proxy server that sends copies of the media stream communications to a delivery function. The delivery function may send the media stream to the appropriate law enforcement agency. If, on the other hand, user data monitoring is not required, the signaling router of the present invention may simply send copies of call signaling messages to the delivery function, which delivers the information to the appropriate enforcement authority. By distinguishing between user data or content-based surveillance and non-user data or non-content-based surveillance, the present invention increases the efficiency at which surveillance is performed.

According to another aspect of the invention, a call server may be dedicated to handling surveillance calls, rather than surveillance calls and non-surveillance calls. As a result, call server resources are available to perform additional surveillance, and the solution is therefore scalable.

Accordingly, it is an object of the invention to provide methods and systems for intelligent surveillance in a communications network.

It is another object of the invention to locate surveillance functionality in a signaling router rather than an access point.

It is yet another object of the invention to provide methods and systems for providing surveillance of calls that utilize different signaling protocols.

Some of the objects of the invention having been stated hereinabove, other objects will become evident as the description proceeds when taken in connection with the accompanying drawings as best described hereinbelow.

BRIEF DESCRIPTION OF THE DRAWINGS

A description of preferred embodiments of the invention will now proceed with reference to the accompanying drawings, of which.

DETAILED DESCRIPTION OF THE INVENTION

Figure 1:
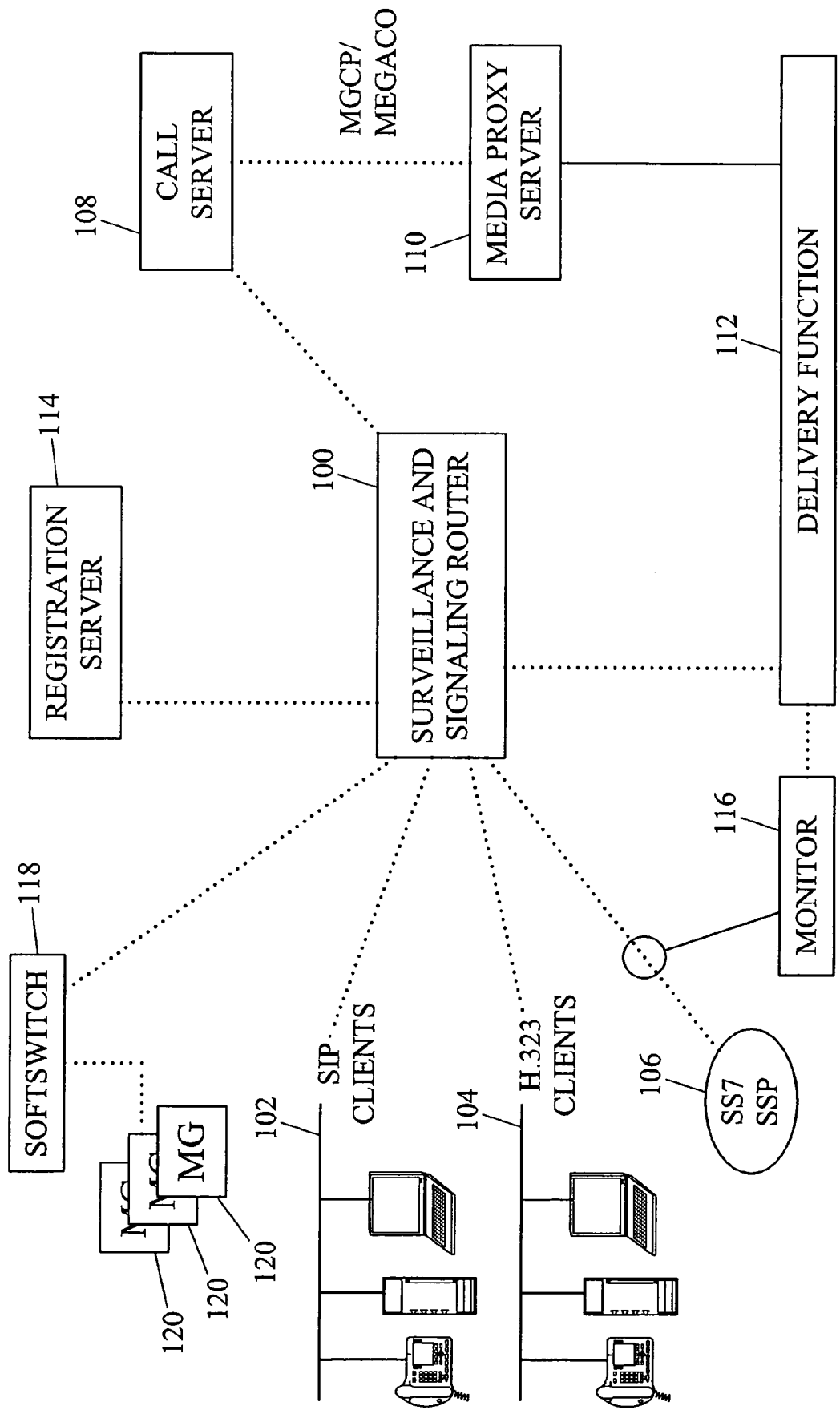
FIG. 1 is a network diagram illustrating an intelligent signaling-router-based surveillance system according to an embodiment of the present invention.

FIG. 1 illustrates a signaling-router-based system for intelligent surveillance according to an embodiment of the present invention. In FIG. 1, the dotted lines represent signaling message flow, and the solid lines represent user data or content flow. The system in FIG. 1 includes a surveillance and signaling router 100 capable of routing call signaling messages of various IP and traditional telephony protocols. For example, surveillance and signaling router 100 may include SIP functionality for routing SIP messages to and from SIP clients 102, H.323 functionality for routing H.323 messages to and from H.323 clients 104, and SS7 functionality for routing messages to and from SS7 nodes, such as SS7 service switching point 106. In order to perform content or user data surveillance, surveillance and signaling router 100 may communicate with the call server 108. Call server 108 may implement any suitable protocol for setting up calls between end users. For example, call server 108 may implement the MGCP/MEGACO protocol. An example of a call server platform suitable for use as call server 108 is the VXi Media Gateway Controller available from Tekelec of Calabasas, Calif.

Media proxy server 110 transmits content to and from SIP clients 102 and H.323 clients 104. According to the present invention, media proxy server 110 may forward copies of content or user data communications to a law enforcement agency or other entity performing surveillance of a user or user equipment. In the illustrated embodiment, media proxy server 110 may forward copies of the content to a delivery function 112. Delivery function 112 may be a server located in the service provider's network for communicating with the entity performing the surveillance.

In order to monitor non-content-related communications, signaling router 100 may identify signaling messages associated with users or user equipment under surveillance, and forward copies of the signaling messages to delivery function 112. Non-content-related messages include any signaling messages associated with the setup, progress, or tear down of a call and non-call-related messages, such as registration messages. SIP clients 102 may register with a registration server 114 before being able to initiate or receive communications. Signaling router 100 may identify and copy such messages and forward the copies to delivery function 112. In addition to the intelligent monitoring provided by surveillance and signaling router 100, the invention may also include conventional monitors 116 for monitoring access links connected to end office or SSP 106.

Additional network entities that may be included in a communications network include softswitch 118 and one or more media gateways 120. In general, a softswitch controls media gateways to send media stream communications between end users. As discussed above, when performing surveillance, media communications preferably proceed through media proxy server 110. Accordingly, signaling router 100 may instruct softswitch 118 to control media gateways 120 to send communications through media proxy server 110 for a user under surveillance.

Figure 2:
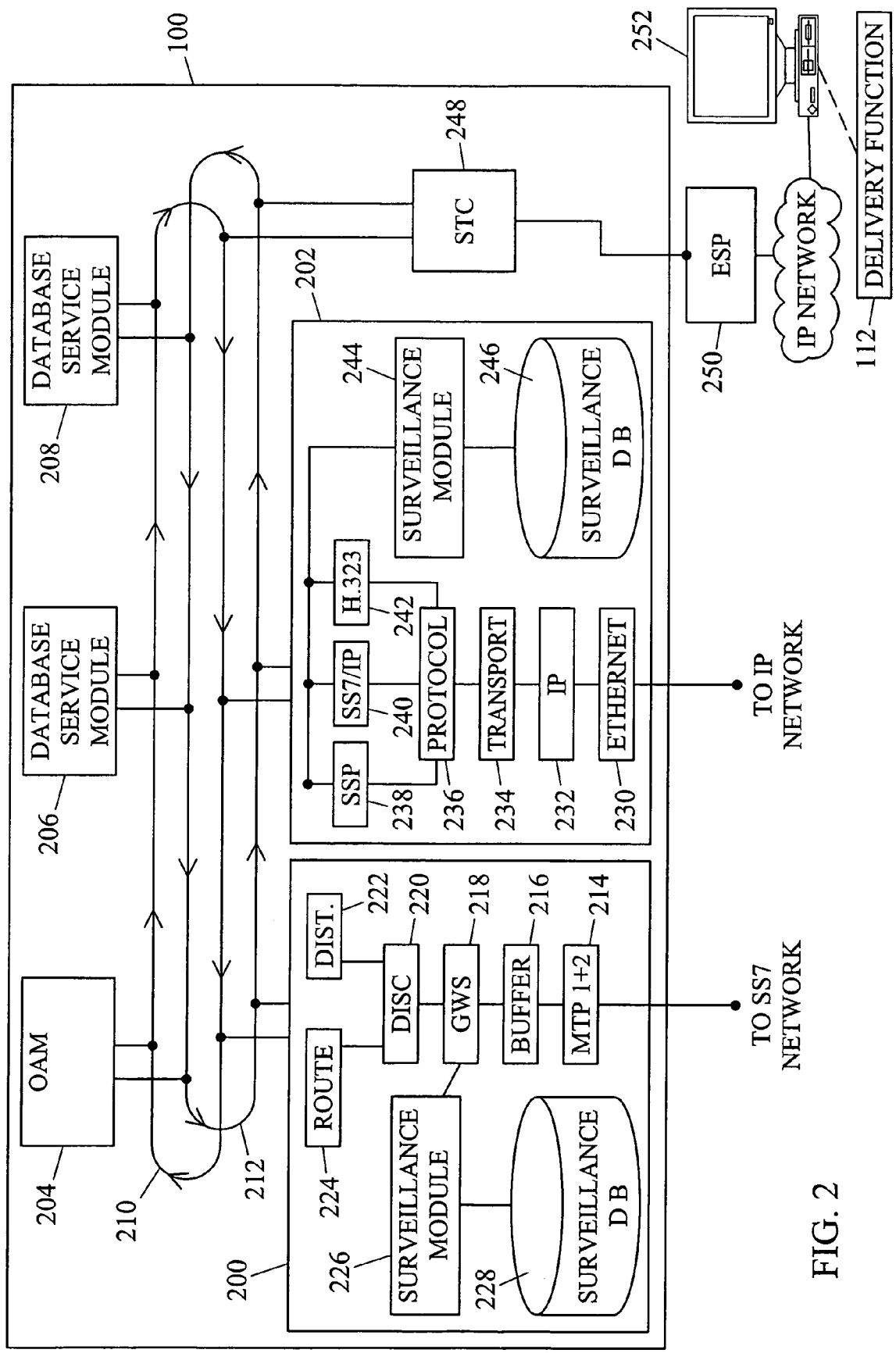
FIG. 2 is a block diagram illustrating an exemplary internal architecture for a surveillance and signaling router according to an embodiment of the present invention.

FIG. 2 illustrates an exemplary architecture for surveillance and signaling router 100 according to an embodiment of the present invention. In FIG. 2, surveillance and signaling router 100 includes a plurality of interface modules connected via one or more buses. In the illustrated example, surveillance and signaling router 100 includes an SS7 interface module 200 for interfacing with an SS7 network, an IP interface module 202 for interfacing with an Internet protocol network, an operations, administration, and maintenance module 204 for performing administrative functions, and database service modules 206 and 208 for providing database services, such as number portability, global title translation, or any other service that requires a database. In the illustrated examples, the modules are connected via a pair of dual-ring, counter-rotating buses 210 and 212.

SS7 module 200 includes an MTP Level 1 and 2 module 214 for performing MTP Level 1 and 2 functions, such as error detection, error correction, and sequence delivery of received SS7 messages. A buffer 216 buffers incoming and outgoing SS7 messages. A gateway screening module 218 screens incoming messages to determine whether messages should be allowed into the carrier's network. A discrimination module 220 determines whether a message is destined for internal processing within surveillance and signaling router 100 or whether the message is destined for processing by another node. If a message is destined for processing within surveillance and signaling router 100, discrimination module 220 forwards the message to distribution module 222. Distribution module 222 distributes the message to the appropriate processor within surveillance and signaling router 100. If a message is not destined for processing within surveillance and signaling router 100, discrimination module 220 forwards the message to routing process 224. Routing process 224 routes the message to the interface module associated with the appropriate outbound signaling link.

In order to provide surveillance based on SS7 messages, SS7 interface module 200 includes a surveillance module 226 and a surveillance database 228. Surveillance module 226 may examine incoming signaling messages to determine whether or not they are associated with a user under surveillance. For SS7 messages, the parameters that may be examined by surveillance module 226 include calling party address and called party address. Surveillance database 228 may include identification information that may be used to identify users under surveillance, surveillance type information that may be used to identify the type of surveillance to be performed, and surveillance action information that may be used to identify the action to be performed for the specific surveillance type.

IP communications module 202 may include an Ethernet module 230 for sending and receiving data over a physical network, such as an Ethernet. Internet protocol module 232 performs IP routing functions. Transport module 234 performs transport layer functions, such as transmission control protocol, user data protocol, or other transport layer function. Protocol identifier module 236 identifies the signaling protocol of inbound signaling messages and forwards the inbound signaling messages to the appropriate application layer signaling protocol. In the illustrated example, IP communication module 202 includes a SIP application 238, an SS7 over IP application 240, and an H.323 application 242. SIP application 238 may perform SIP routing functions according to the SIP protocol. SS7 over IP application 240 functions as an interface between SS7 and IP protocols. H.323 application 242 may route received H.323 messages.

IP communications module 202 may include a surveillance module 244 and a surveillance database 246 for performing surveillance functions. For example, surveillance module 244 may analyze signaling messages received by applications 238, 240, and 242 to determine whether the messages are associated with a user under surveillance, determine the surveillance type associated with the user under surveillance, and perform the appropriate surveillance action. Database 246 may include multi-protocol identification information for identifying signaling messages associated with users under surveillance, surveillance type information, and surveillance action information. For example, database 246 may include SIP, H.323, and SS7 user identification information, pen register, trap and trace, and content-based surveillance type information, and corresponding surveillance action information.

In order to provide non-content-based surveillance, such as pen register or trap and trace surveillance, surveillance and signaling router 100 may include one or more sentinel transport cards 248 and sentinel processors 250. In one embodiment, interface modules 200 and 202 may include a TCP/IP protocol stack for establishing TCP/IP connections with sentinel processor 250 through transport card 248. In such an embodiment, surveillance modules 226 and 244 may function as clients that request service from sentinel processor 250. When sentinel processor 250 accepts a service request, surveillance modules 226 and 244 may transmit signaling messages associated with users under surveillance to sentinel processor 250 via TCP/IP connections. Sentinel processor 250 sends the signaling messages to an external server 252 via an IP network. Server 252 includes delivery function 112, which delivers the signaling messages to the party performing the surveillance.

Figure 3:
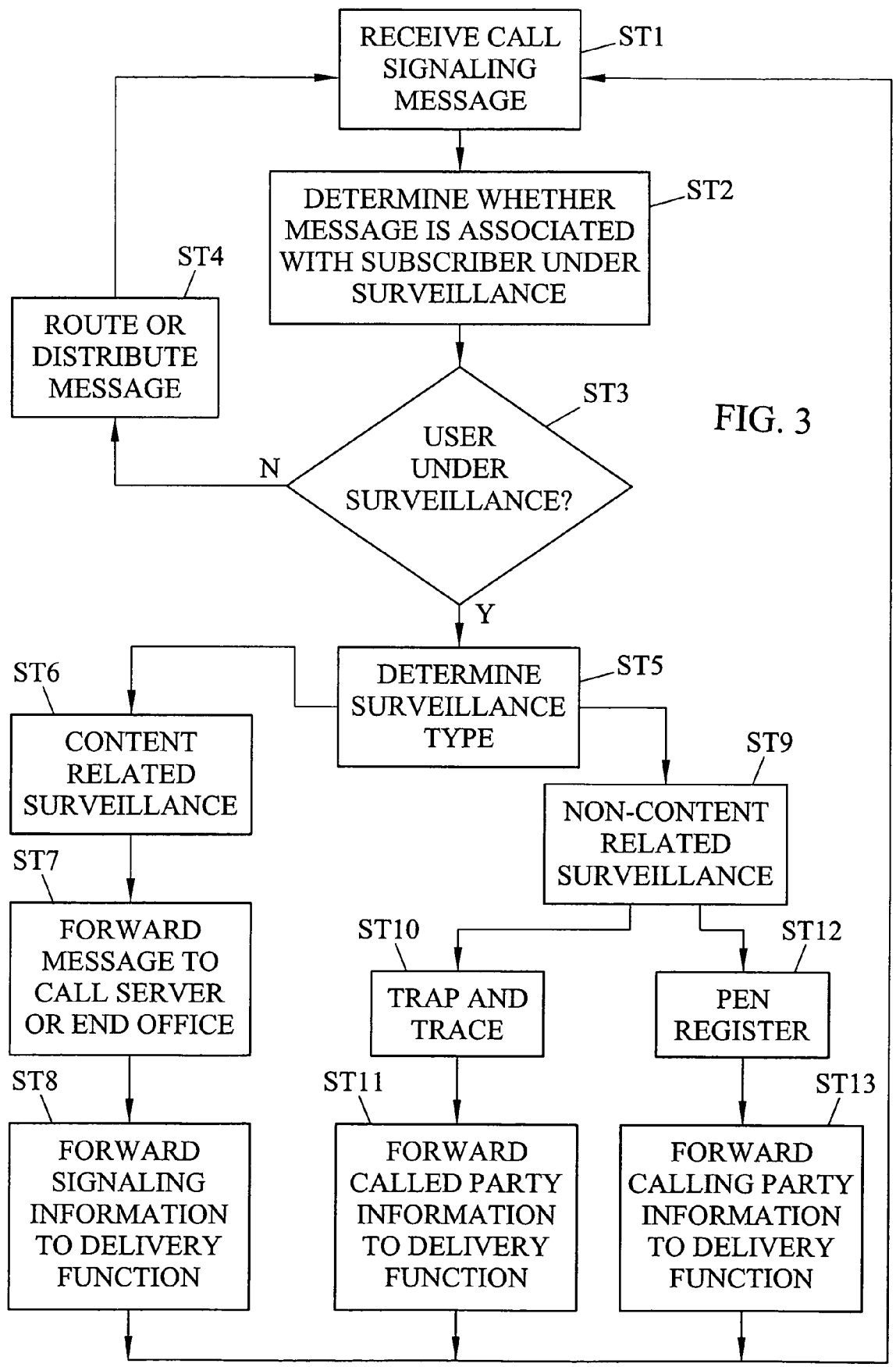
FIG. 3 is a flow chart illustrating exemplary steps that may be performed by a surveillance module in processing a call-related signaling message according to an embodiment of the present invention.

FIG. 3 is a flowchart illustrating exemplary steps that may be performed by a surveillance module, such as surveillance module 226 or 244, in processing a call-related signaling message according to an embodiment of the present invention. As used herein, the term "call-related signaling message" refers to any signaling messages associated with the setup, progress, or tear-down of a call. Call-related signaling messages can be distinguished from non-call-related signaling messages, such as SIP registration messages, which are not related to a particular call. Referring to FIG. 3, in step ST1, the surveillance module receives a call-related signaling message. In steps ST2 and ST3, the surveillance module determines whether the user is under surveillance. This determination may be performed by extracting called or calling party identification information from the signaling message and performing a lookup in the surveillance database. In step ST4, if the signaling message is not associated with a user under surveillance, the surveillance module routes or distributes the message as normal.

According to an important aspect of the invention, if the surveillance module determines that the signaling message is associated with a user under surveillance, the surveillance module determines the surveillance type. Control proceeds to step ST6 if the surveillance module determines that the surveillance type is content related. Content related surveillance, as used herein, refers to surveillance that requires monitoring of actual user communications, such as voice communications or data communications that occur over a bearer channel, rather than a signaling channel. If the surveillance is content related, in step ST7, the surveillance module forwards the signaling message to a call server to intercept the user's media communications. The call server may also forward the signaling message or information from the signaling message to a delivery function (Step ST8). In step ST9, if the surveillance module identifies the surveillance as non-content related, there is no need to notify the call server. The surveillance module further identifies the sub-type of non-content-related surveillance. Control proceeds to step ST10 if the sub-type is trap and trace. Trap and trace surveillance, as defined in CALEA, refers to surveillance relating to dialed digits or outgoing calls from a user under surveillance. Accordingly, in step ST11, called party information is sent to the delivery function. The delivery function then delivers the call record to the appropriate law enforcement agency.

If the surveillance sub-type is identified as pen register, control proceeds to step ST12 and ST13. Pen register surveillance is defined in CALEA as surveillance related to originating party information. Accordingly, in step ST13, the surveillance function forwards originating party information to the delivery function. The delivery function delivers the information to the appropriate law enforcement agency. Thus, by identifying the appropriate surveillance type, the present invention optimizes subsequent surveillance processing.

While FIG. 3 illustrates exemplary processing that may be performed by a surveillance module according to the present invention for the call-related case, the present invention is not limited to performing surveillance for call-related signaling messages. A surveillance module according to the present invention may also record non-call-related signaling messages for users or user equipment under surveillance. Examples of non-call-related signaling messages that may be monitored include SIP registration messages and call forwarding signaling messages. A surveillance module may collect non-call-related signaling messages using processing steps similar to those illustrated in FIG. 3. Once non-call-related information is captured for a user under surveillance, the surveillance module may store the information and send the information to the delivery function along with subsequently collected call-related information. For example, a user under surveillance may register his or her SIP phone by sending a registration message to a SIP registration server. A surveillance module may capture and store a copy of the registration message. The user may then establish a call with another user. The surveillance module may capture the content and signaling for the call and forward this information along with the previously captured registration information to the delivery function. In another example, a surveillance module may send call forwarding information to the delivery function at the time of capture of a call forwarding signaling message or when the call is actually set up. Thus, the present invention is capable of performing both call-related and non-call-related surveillance.

Figure 4:
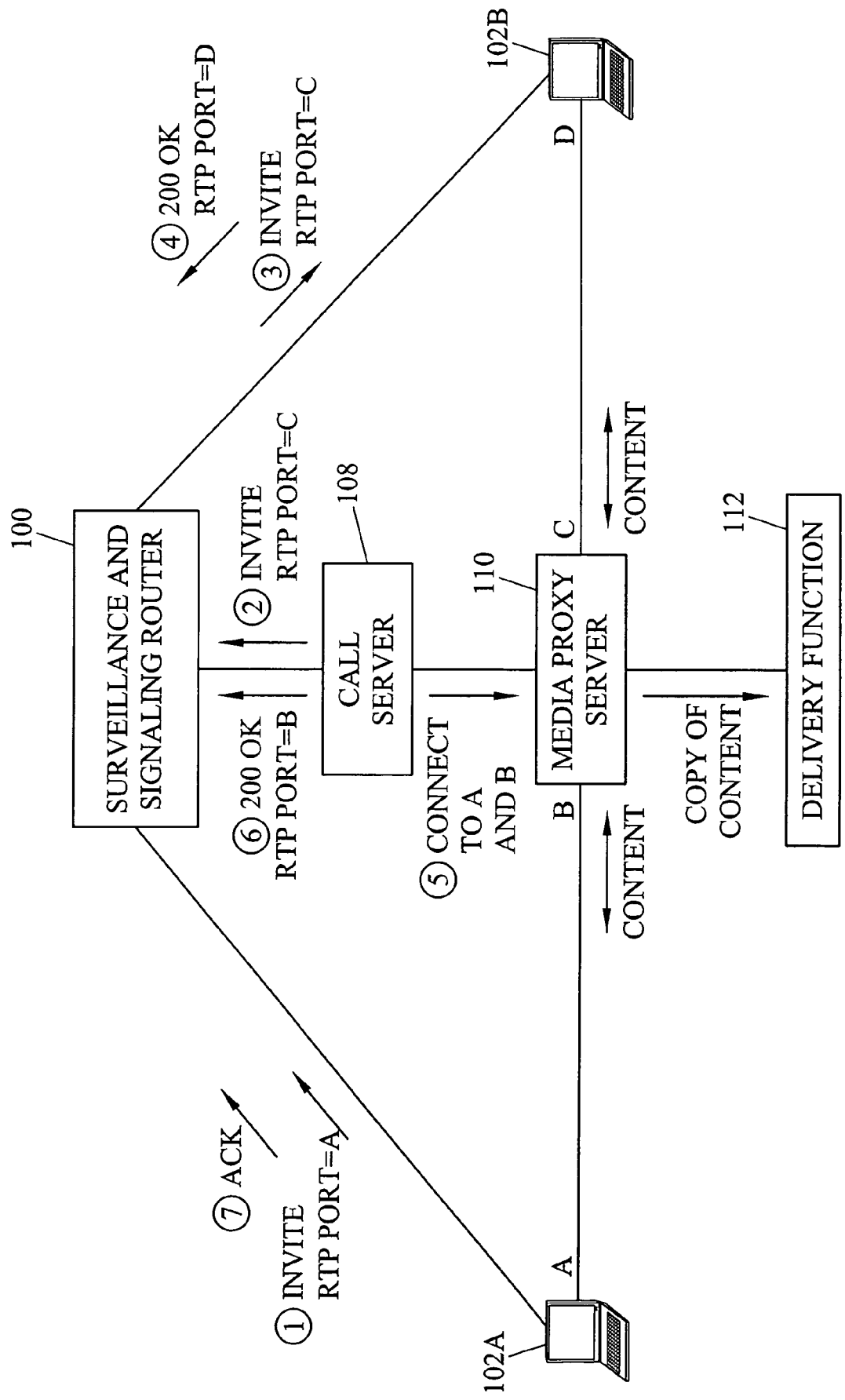
FIG. 4 is a network diagram illustrating an exemplary call flow for content-based surveillance according to an embodiment of the present invention.

FIG. 4 is a network diagram illustrating an example of content-based surveillance according to an embodiment of the present invention. In FIG. 4, a SIP user 102A places a call to another SIP user 102B. In order to initiate the call, user 102A sends an INVITE message to surveillance and signaling router 100. The INVITE message contains the real time protocol (RTP) port at which the calling party receives media stream or content communications. In this example, the incoming RTP port for user 102A is port A. The INVITE message also contains the calling and called party SIP addresses and media capabilities of the calling party.

Surveillance and signaling router 100 receives the INVITE message and performs a lookup in one of its surveillance databases to determine whether the calling or called user is under surveillance. The lookup may be performed based on the SIP addresses in the INVITE message. In this example, it is assumed that one or both users are under surveillance. Accordingly, surveillance and signaling router 100 next determines the surveillance type. The surveillance type is assumed in this example to be content-based. For content-based surveillance, surveillance and signaling router forwards the INVITE message to call server 108. Call server 108 replaces the RTP port in the message for the calling user with port C on media proxy server 110 and forwards the INVITE message to called user 102B via surveillance and signaling router 100.

In response to receiving the INVITE message, called user 102B formulates a SIP 200 OK message containing its incoming RTP port and media capabilities and sends the 200 OK message to calling user 102A via surveillance and signaling router 100. Surveillance and signaling router 100 identifies the message as being associated with a user under content-based surveillance and forwards the 200 OK message to call server 108. Call server 108 replaces the RTP media port in the 200 OK message with port B on media proxy server 110 and forwards the 200 OK message to calling user 102A via surveillance and signaling router 100. Call server 108 extracts the media capabilities of user 102B from the 200 OK message and creates an internal connection between media ports B and C so that users 102A and 102B can communicate.

In response to the 200 OK message, calling user 102A sends an ACK message to called user 102B via surveillance and signaling router 100. Surveillance and signaling router 100 sends a copy of the ACK message to call server 108. Calling party 102A connects to port B on media proxy server 110, and called party 102B connects to port C on media proxy server 110. However, because the connection through media proxy server 110 was set up by transparently changing parameters in call signaling messages, neither the called nor the calling user knows that media communications go through media proxy server 110.

Media proxy server 110 forwards media communications between users 102A and 102B and sends a copy of the media communications to delivery function 112. Delivery function 112 forwards the communications to the entity performing the surveillance.

Thus, the present invention is capable of transparently and efficiently performing content-based surveillance. The transparency is achieved by replacing the media ports in call setup messages so that communications are set up through a media proxy server. Efficiency is achieved because the surveillance and signaling router filters calls that require surveillance and preferably only forwards calls that require content-based surveillance to call server 108. Calls that do not require surveillance may be sent to an alternate call server (not shown). Because call server 108 may only be required to handle calls that require content-based surveillance, the present invention is more scalable and efficient that conventional solutions where the same call server handles surveillance and non-surveillance calls.

Figure 5:
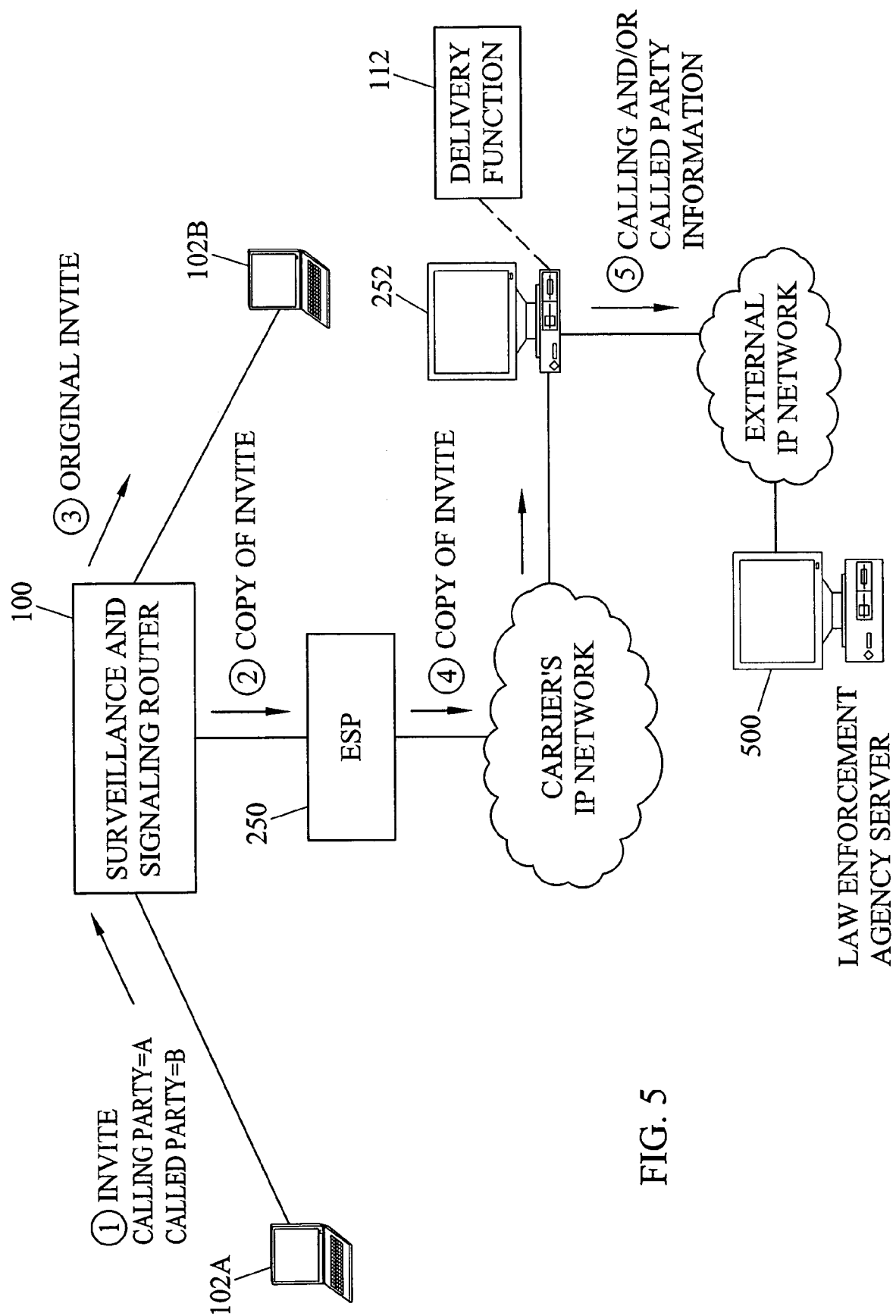
FIG. 5 is a network diagram illustrating an exemplary call flow for non-content-based surveillance according to an embodiment of the present invention.

As discussed above, a surveillance and signaling router according to the present invention is also capable of performing non-content-based surveillance. FIG. 5 is a network diagram illustrating an example of non-content-based surveillance according to an embodiment of the present invention. In FIG. 5, user 102A initiates a SIP call with user 102B. First, user 102A forwards a SIP INVITE message to user 102B through surveillance and signaling router 100. The SIP INVITE message may include calling and called party SIP identifiers and media capabilities for the calling party. Surveillance and signaling router 100 receives the INVITE message and performs a lookup in one of its surveillance databases using the called and calling party SIP identifiers to determine whether either or both parties are under surveillance and to determine the surveillance type. In this example, it is assumed that the calling party is under non-content-based surveillance.

Surveillance and signaling router 100 forwards the original INVITE message to called user 1 02B and copies some or all of the information from the INVITE message according to the specific type of non-content-based surveillance to be performed. For example, if signaling and surveillance router 100 determines that trap and trace surveillance is required, surveillance and signaling router 100 may extract and forward called party address information to surveillance server 252. If pen register surveillance is required, surveillance and signaling router 100 may extract and forward calling party address information to surveillance server 252. In another alternative, surveillance and signaling router 100 may simply forward a copy of the INVITE message to surveillance server 252 along with an indication of the surveillance type, and surveillance server 252 may extract the calling and/or called party information, as appropriate. Delivery function 112 in surveillance server 252 forwards the called and/or called party information to law enforcement agency server 500. Because signaling messages are copied and the original signaling messages are forwarded to their intended destinations, non-content-based surveillance is performed transparently to the users under surveillance. In addition, because surveillance is performed at a signaling router centrally located in a service provider's network, the type and/or users under surveillance can be more easily modified that conventional switch-based solutions. However, the present invention is not limited to performing surveillance using a single centrally located surveillance and signaling router. In an alternate embodiment, surveillance and signaling router functionality may be distributed across multiple surveillance and signaling router nodes.

Although the examples described herein have been primarily voice-call-related, the present invention is not limited to performing surveillance of voice calls. Surveillance can be performed of any type of transaction that requires signaling messages to be sent through a signaling router. Examples of communications that can be monitored include voice calls, connection-oriented data transmissions, video conferences, email, etc.

While the invention has been described using CALEA surveillance as an example, the present invention is not limited to CALEA-based surveillance. Any surveillance that relates to signaling messages sent through a signaling router is intended to be within the scope of the invention.

It will be understood that various details of the invention may be changed without departing from the scope of the invention. Furthermore, the foregoing description is for the purpose of illustration only, and not for the purpose of limitation-the invention being defined by the claims.

What is claimed is:

1. A method for intelligent signaling-router-based surveillance, the method comprising:
at a signaling router capable of routing call-related signaling messages between users in a communications network:
(a) receiving a signaling message;
(b) determining whether the signaling message is associated with a user or device under surveillance by extracting at least one parameter from the signaling message and performing a lookup in a database;
(c) in response to determining that the signaling message is associated with a user or device under surveillance, determining whether content-related or non-content-related surveillance is required;
(d) in response to determining that non-content-related surveillance is required, copying data from the signaling message and forwarding the data to a delivery function; and
(e) in response to determining that content-related surveillance is required, forwarding the signaling message to a call server.

2. The method of claim 1 wherein performing steps (a)–(d) at a signaling router includes performing steps (a)–(d) at a signaling router capable of routing call signaling messages of a plurality of different call signaling protocols.

3. The method of claim 1 wherein receiving a signaling message includes receiving a SIP signaling message.

4. The method of claim 1 wherein receiving a signaling message includes receiving an H.323 signaling message.

5. The method of claim 1 wherein receiving a signaling message includes receiving an SS7 signaling message.

6. The method of claim 1 wherein receiving a signaling message includes receiving a signaling message from a first user of a first signaling protocol for establishing a call with a second user of a second signaling protocol different from the first signaling protocol.

7. The method of claim 1 wherein determining whether the signaling message is associated with a user or device under surveillance includes searching a surveillance database in the signaling router using a user or device identifier extracted from the signaling message.

8. The method of claim 7 wherein the user or device identifier comprises a SIP URL.

9. The method of claim 7 wherein the user or device identifier comprises an IP address.

10. The method of claim 7 wherein the user or device identifier comprises a calling or called party address.

11. The method of claim 1 wherein copying data from the signaling message includes copying user identification information from the signaling message.

12. The method of claim 1 wherein copying data from the signaling message includes copying user location information from the signaling message.

13. The method of claim 1 comprising, at the call server, signaling the called and calling users for establishing media communications through a media proxy server.

14. The method of claim 13 wherein signaling the called and calling users includes altering signaling parameter information in the call-related signaling message and forwarding the altered signaling message to its intended destination.

15. The method of claim 14 wherein altering signaling parameter information includes altering media port information in the call-related signaling message.

16. The method of claim 13 comprising, at the media proxy server, forwarding content between the called and calling users and copying the content to a delivery function.

17. The method of claim 16 wherein the content includes voice data.

18. The method of claim 16 wherein the content includes video data.

19. The method of claim 16 wherein the content includes text messages.

20. The method of claim 1 comprising:
(a) receiving a non-call-related signaling message;
(b) determining whether the non-call-related signaling message is associated with a user or device under surveillance; and
(c) in response to determining that the non-call-related signaling message is associated with a user or subscriber under surveillance, copying information from the non-call-related signaling messages and forwarding the information to the delivery function.

21. A method for intelligent surveillance, the method comprising:
at a signaling message router for routing signaling messages between signaling links in a communications network:
(a) receiving a signaling message;
(b) determining, using a database and at least one parameter in the signaling message, a surveillance type required for a user, wherein determining a surveillance type includes determining whether at least one of content-related, non-content-related, trap and trace, and pen register surveillance is required for the user; and
(c) performing a surveillance action based on the surveillance type.

22. The method of claim 21 wherein determining a surveillance type required for a user includes determining whether content-related or non-content-related surveillance is required for the user.

23. The method of claim 22 wherein, in response to determining that non-content-related surveillance is required for the user, the method further includes determining a surveillance subtype required for the user.

24. The method of claim 23 wherein determining a surveillance subtype required for the user includes determining whether trap and trace or pen register surveillance is required for the user.

25. The method of claim 21 wherein performing a surveillance action includes copying the signaling message and forwarding the original signaling message to its intended destination.

26. The method of claim 21 wherein steps (a)–(c) are performed at a signaling message router.

27. A surveillance and signaling router comprising:
(a) a communications module including a communications protocol stack for sending and receiving signaling messages over a packet-based network;
(b) a surveillance module operatively associated with the communications module for identifying signaling messages associated with users or devices under surveillance, determining a surveillance type for the signaling messages associated with users under surveillance, and for performing a surveillance action based on the surveillance type; and
(c) a surveillance database operatively associated with the surveillance module for storing data for identifying the signaling messages associated with users or devices under surveillance, the surveillance types, and the surveillance actions, wherein the surveillance module is adapted to access the surveillance database using parameters in received signaling messages and determine corresponding surveillance types and surveillance actions.

28. The surveillance and signaling router of claim 27 wherein the communications module is adapted to send and receive signaling messages over an IP network.

29. The surveillance and signaling router of claim 27 wherein the communications module is adapted to send and receive signaling messages over an SS7 network.

30. The surveillance and signaling router of claim 28 wherein the communications module includes a SIP signaling application for sending receiving SIP signaling messages over the IP network.

31. The surveillance and signaling router of claim 28 wherein the communications module includes an H.323 signaling application for sending and receiving H.323 signaling messages over the IP network.

32. The surveillance and signaling router of claim 27 including a plurality of communications modules for sending and receiving signaling messages over a plurality of networks of different types.

33. The surveillance and signaling router of claim 27 wherein the surveillance module is adapted to determine whether signaling messages are associated with calls that require content-based or non-content-based surveillance.

34. The surveillance and signaling router of claim 33 wherein the surveillance module is adapted to redirect the signaling messages associated with calls requiring content-based surveillance to a call server.

35. The surveillance and signaling router of claim 33 wherein, for the signaling messages that require non-content-based surveillance, the surveillance and signaling router is adapted to determine whether trap and trace or pen register surveillance is required.

36. An intelligent signaling-router-based surveillance system, the system comprising:

(a) a surveillance and signaling router for routing signaling messages, identifying messages associated with users under surveillance, determining surveillance types for the identified signaling messages, and performing surveillance actions based on the surveillance types, wherein the surveillance and signaling router is adapted to determine the surveillance types using a database and parameters in the signaling messages;

(b) a call server operatively associated with the signaling router for receiving call signaling messages associated with users under content-based surveillance and for establishing the content-based surveillance; and (c) a media proxy server operatively associated with the call server for sending and receiving content between users under content-based surveillance and for copying the content to a delivery function.

37. The system of claim 36 wherein the surveillance and signaling router is adapted to route signaling messages of a plurality of different signaling protocols and to perform surveillance actions for each of the signaling protocols.

38. The system of claim 36 wherein the surveillance and signaling router is adapted to distinguish between signaling messages associated with content-related and non-content-related surveillance and to forward the signaling messages associated with content-related surveillance to the call server.

39. The system of claim 36 wherein the surveillance and signaling router includes a copy function for copying signaling messages associated with non-content-related surveillance to an external device.

40. The system of claim 36 wherein the call server is dedicated to controlling content-related surveillance calls.

* * * * *